United States Patent
Schoen et al.

(10) Patent No.: US 11,479,681 B2
(45) Date of Patent: *Oct. 25, 2022

(54) EFFECT PIGMENTS

(71) Applicant: Merck Patent GmbH, Darmstadt (DE)

(72) Inventors: Sabine Schoen, Herten (DE); Michael Jungnitz, Dreieich (DE); Stefan Schlueter, Bickenbach (DE); Kirsten Fritsche, Darmstadt (DE); Carsten Plueg, Muehltal (DE); Stephanie Andes, Hanau (DE); Ulrich Schoenefeld, Bickenbach (DE)

(73) Assignee: Merck Patent GmbH, Darmstadt (DE)

( * ) Notice: Subject to any disclaimer, the term of this patent is extended or adjusted under 35 U.S.C. 154(b) by 198 days.

This patent is subject to a terminal disclaimer.

(21) Appl. No.: 16/718,375

(22) Filed: Dec. 18, 2019

(65) Prior Publication Data

US 2020/0123388 A1 Apr. 23, 2020

Related U.S. Application Data

(62) Division of application No. 16/225,684, filed on Dec. 19, 2018, which is a division of application No. 15/438,901, filed on Feb. 22, 2017.

(30) Foreign Application Priority Data

Feb. 23, 2016 (EP) .................................. 16156942

(51) Int. Cl.

| | |
|---|---|
| *C09D 7/62* | (2018.01) |
| *C09C 1/00* | (2006.01) |
| *C09D 7/40* | (2018.01) |
| *C01F 7/34* | (2006.01) |
| *C09D 7/61* | (2018.01) |
| *C08K 9/02* | (2006.01) |
| *C08K 3/22* | (2006.01) |

(52) U.S. Cl.
CPC .................. *C09D 7/62* (2018.01); *C01F 7/34* (2013.01); *C09C 1/0015* (2013.01); *C09C 1/0018* (2013.01); *C09C 1/0021* (2013.01); *C09C 1/0024* (2013.01); *C09C 1/0036* (2013.01); *C09C 1/0039* (2013.01); *C09C 1/0051* (2013.01); *C09D 7/70* (2018.01); *C01P 2002/52* (2013.01); *C01P 2002/54* (2013.01); *C01P 2004/20* (2013.01); *C01P 2004/52* (2013.01); *C01P 2004/54* (2013.01); *C01P 2004/61* (2013.01); *C01P 2004/84* (2013.01); *C01P 2006/60* (2013.01); *C08K 9/02* (2013.01); *C08K 2003/2227* (2013.01); *C09C 2200/1004* (2013.01); *C09C 2200/301* (2013.01); *C09C 2200/307* (2013.01); *C09C 2200/401* (2013.01); *C09C 2200/407* (2013.01); *C09C 2200/408* (2013.01); *C09C 2200/409* (2013.01); *C09C 2220/10* (2013.01); *C09D 7/61* (2018.01)

(58) Field of Classification Search
CPC .... C09D 7/70; C09D 7/62; C09D 7/61; C09C 1/0015; C09C 1/0018; C09C 1/0021; C09C 1/0024; C09C 1/0036; C09C 1/0051; C09C 2200/1004; C09C 2200/301; C09C 2200/307; C09C 2200/401; C09C 2200/407; C09C 2200/408; C09C 2220/10; C01P 2004/02; C01P 2004/61; C01P 2004/84; C01P 2006/60; C08K 2003/2227

See application file for complete search history.

(56) References Cited

U.S. PATENT DOCUMENTS

| | | |
|---|---|---|
| 4,544,415 A | 10/1985 | Franz |
| 5,423,912 A | 6/1995 | Sullivan |
| 5,433,119 A | 7/1995 | Rogers |
| 5,433,779 A | 7/1995 | DeLuca et al. |
| 5,472,491 A | 12/1995 | Duschek |
| 6,596,070 B1 | 7/2003 | Schmidt |
| 6,692,561 B1 | 2/2004 | Schoen |
| RE41,858 E | 10/2010 | Duschek |
| 7,959,894 B2 | 6/2011 | Lee |
| 8,821,627 B2 | 9/2014 | Kunii |
| 10,647,861 B2 | 5/2020 | Suzuki et al. |
| 2005/0253117 A1 | 11/2005 | Pfaff |
| 2009/0249979 A1 | 10/2009 | Kaupp |
| 2009/0320719 A1 | 12/2009 | Lee |
| 2010/0089291 A1 | 4/2010 | Kang |
| 2011/0226161 A1* | 9/2011 | Schumacher ......... C09C 1/0024 106/417 |
| 2013/0251771 A1 | 9/2013 | Shimizu |
| 2014/0322536 A1 | 10/2014 | Suzuki |

(Continued)

FOREIGN PATENT DOCUMENTS

| | | |
|---|---|---|
| DE | 3334598 A1 | 4/1985 |
| EP | 0632109 A1 | 1/1995 |

(Continued)

OTHER PUBLICATIONS

Search Report in corresponding GB 1702630 dated Aug. 21, 2017.

(Continued)

*Primary Examiner* — Pegah Parvini
(74) *Attorney, Agent, or Firm* — Millen, White, Zelano and Branigan, P.C.; Harry B. Shubin

(57) ABSTRACT

Effect pigments based on $Al_2O_3$ flakes with high weather resistance and less photoactivity and to their use thereof in paints, industrial coatings, automotive coatings, printing inks, cosmetic formulations. The effect pigments have a ratio of the amount by weight of $Al_2O_3$ of the $Al_2O_3$ flake and the amount by weight of the metal oxide(s) of the coating layer(s) in the range of from 27:73 to 83:17 based on the total weight of the effect pigment.

20 Claims, No Drawings

(56) References Cited

U.S. PATENT DOCUMENTS

| | | |
|---|---|---|
| 2015/0098972 A1 | 4/2015 | Schumacher |
| 2015/0259536 A1 | 9/2015 | Gruener |
| 2017/0088712 A1 | 3/2017 | Kang |
| 2017/0130054 A1 | 5/2017 | Dietz |

FOREIGN PATENT DOCUMENTS

| | | |
|---|---|---|
| EP | 0649886 A2 | 4/1995 |
| EP | 2799398 A2 | 11/2014 |
| JP | 2014218425 A | 11/2014 |
| WO | 2008020665 A1 | 2/2008 |
| WO | 2012055493 A1 | 5/2012 |
| WO | 2015139825 A1 | 9/2015 |

OTHER PUBLICATIONS

Search report in corresponding EP17157284 dated Jul. 24, 2017.
Search report in corresponding EP 1715284.5 dated Aug. 3, 2018 (pp. 1-8).
Rejection notice in corresponding Japanese Patent Application No. 2017-032410 dated Dec. 1, 2020 (pp. 1-7).

\* cited by examiner

EFFECT PIGMENTS

The present invention relates to effect pigments based on $Al_2O_3$ flakes with high weather resistance and less photoactivity and to their use thereof in paints, industrial coatings, automotive coatings, printing inks, cosmetic formulations.

Imparting a pearlescent luster, metallic luster, color flop or multicolor effect can be achieved by using pearlescent pigments based on natural or synthetic transparent flakes. Pearlescent pigments based on $\alpha$-$Al_2O_3$ flakes are well-known in the literature and commercially available, for example, under the trademark Xirallic® from Merck KGaA.

The effect pigments based on $Al_2O_3$ flakes of the prior art often have the disadvantages that they do not have a very high chemical and weather stability and sometimes show a greyish color masstone and/or tend to agglomerate when incorporated into cosmetic and paint compositions.

Metal oxide coated $Al_2O_3$ flakes based on aluminum oxide flakes doped with titanium dioxide are known from U.S. Pat. No. 5,702,519.

WO 2006/101306 A1 and WO 2008/026829 A1 relate to zinc doped $Al_2O_3$ flakes and to pearlescent pigments based on these $Al_2O_3$ flakes. These zinc doped $Al_2O_3$ flakes are not stable under acidic conditions and thus not suitable for all applications.

These effect pigments based on $Al_2O_3$ flakes of the prior art also often have the disadvantages that they do not have a very sufficient high chemical and weather stability and sometimes show a greyish color masstone and/or tend to agglomerate when incorporated into cosmetic and paint compositions.

An object of the present invention is to provide improved effect pigments based on $Al_2O_3$ flakes which do not show the disadvantages of the prior art and are characterized by a high stability and high gloss and do not show any tendency to agglomeration when incorporated into compositions.

Surprisingly, it has now been found that the properties of the effect pigments based on alumina flakes coated with one or more metal oxides can be increased by using alumina flakes with precisely defined ratios of the amount of $Al_2O_3$ of the $Al_2O_3$ flakes (substrate) and the total amount of all metal oxide(s) of the coating layer(s).

In particular the agglomeration behaviour and the weather stability of the effect pigments can be favorably influenced by the defined $Al_2O_3$/metal oxide ratio of the invention. In addition, the effect pigments with the defined ratio show improved luster, chroma and very pure colors.

Thus, an aspect of the present invention is to provide effect pigments based on alumina flakes characterized in that $Al_2O_3$ flakes are coated with one or more layers of a metal oxide or metal oxide mixture wherein the ratio of the amount of $Al_2O_3$ of the $Al_2O_3$ flakes to the total amount of the metal oxide(s) of the coating layers is in the range of 27:73 to 83:17 based on the total effect pigment.

In case that the interference and/or masstone color of the effect pigment is silver, the ratio of the amount of $Al_2O_3$ of the $Al_2O_3$ flakes to the amount of the metal oxide(s) of the coating layer(s) is preferably in the range of 60:40 to 80:20 based on the total effect pigment.

In case that the interference and/or masstone color of the effect pigment is blue, the ratio of the amount of $Al_2O_3$ of the $Al_2O_3$ flakes to the amount of the metal oxide(s) or the coating layer(s) is preferably in the range of 35:65 to 60:40 based on the total effect pigment.

In case that the interference and/or masstone color of the effect pigment is red, the ratio of the amount of $Al_2O_3$ of the $Al_2O_3$ flakes to the amount of the metal oxide(s) of the coating layer(s) is preferably in the range of 35:65 to 65:35 based on the total effect pigment.

The effect flakes according to the invention can be employed in all formulations where effect pigments are usually employed, such as, for example, in inks, coatings, preferably automotive coatings and industrial coatings, plastics, and cosmetic formulations.

Compared to the prior art, the effect pigments according to the present invention show improved application properties like improved weather stability and less tendency to agglomeration and to become greyish and at the same time show improved optical properties, in particular increased chroma, higher luster, lower haze and excellent finishing and at the same time a high chemical stability.

A feature of the effect pigments according to the invention is the ratio of $Al_2O_3$ (substrate) to the total amount of metal oxide on the surface of the $Al_2O_3$ substrate. The term "metal oxide" also includes metal oxide mixtures.

In this patent application the term "amount" refers to the weight, for example, of the $Al_2O_3$ flakes and the weight of all metal oxides, including metal oxide mixtures, of all coating layers on the surface of the $Al_2O_3$ flakes.

The coating of $Al_2O_3$ substrates with one or more metal oxides is well-known and suitable metal oxides are selected preferably from $TiO_2$, $Fe_2O_3$, $Fe_3O_4$, $SnO_2$, $ZrO_2$, $ZnO$, $Cr_2O_3$, $FeTiO_5$, or mixtures thereof. Preferred metal oxide mixtures are selected from $TiO_2/Fe_2O_3$.

The term metal oxide in this patent application also includes $SiO_2$.

The effect pigments are based on $Al_2O_3$ flakes which have preferably a thickness of 130-500 nm. Preferred $Al_2O_3$ flakes have a thickness of preferably 130-400 nm and in particular 150-350 nm.

Preferred $Al_2O_3$ flakes have a particle size distribution characterized by a Gaussian distribution in which the volume size fractions are distributed as follows:

$D_{50}$ is in the range of 15-30 µm, preferably 15-25 µm;
$D_{90}$ is in the range of 30-45 µm, preferably 30-40 µm.

In this patent application $D_{10}$, $D_{50}$ and $D_{90}$ of the alumina flakes are evaluated by using Malvern MS 2000.

The particle size distribution $D_{50}$ is also known as the median diameter or the medium value of the particle size distribution; it is the value of the particle diameter at 50% in the cumulative distribution and is one of the important parameters characterizing the particle size of pigments.

Correspondingly, the $D_{90}$ value indicates the maximum longitudinal dimensions of the $Al_2O_3$ flakes, as determined again by means of laser granulometry in the form of sphere equivalents, which 90% of the particles attain at maximum, or fall below, out of the entirety of all $Al_2O_3$ particles.

In a preferred embodiment the $D_{10}$ value of the alumina flakes according to the present invention is >9.0, preferably ≥9.5.

The $D_{10}$ value indicates the value of the longitudinal dimension of the $Al_2O_3$ flakes, as determined by means of laser granulometry in the form of the sphere equivalent, which 10% of the flakes attain at most, or fall below, out of the entirety of all the $Al_2O_3$ flakes.

In a preferred embodiment, the $Al_2O_3$ flakes according to the present invention have a standard deviation of the thickness distribution of less than 80, preferably 5-60 and in particular 10-50.

In this patent application the average thickness is determined on the basis of a cured paint film in which the $Al_2O_3$ flakes are oriented substantially plane-parallel to the substrate. For this purpose a transverse section of the cured paint film is examined under a scanning electron microscope (SEM), the thickness of 100 $Al_2O_3$ flakes being ascertained and statistically averaged.

The desired size and thickness distribution can be obtained by suitable classification of the flakes, such as by classifying through selected screens and the like.

The $Al_2O_3$ flakes according to the invention preferably have an aspect ratio (diameter/thickness ratio) of 30-200, in particular of 50-150.

In a preferred embodiment the $Al_2O_3$ flakes of the present invention are $\alpha$-$Al_2O_3$ flakes.

The $Al_2O_3$ flakes can be prepared by methods known per se, as described in the literature.

To control the particle size, thickness, optical properties and/or surface morphology it could be helpful to use doped $Al_2O_3$. The dopant is preferably selected from the following group of compounds: $TiO_2$, $ZrO_2$, $SiO_2$, $In_2O_3$, $SnO_2$, $ZnO$ and combinations thereof. The $Al_2O_3$ flakes can contain one or more dopants, preferably in amounts of 0.01-5 wt. % based on the $Al_2O_3$ flake. In a preferred embodiment the $Al_2O_3$ flakes contain one dopant only.

In a preferred embodiment the dopant is $TiO_2$, $ZrO_2$ or $ZnO$, preferably used in amounts of 0.05-3 wt. % based on the $Al_2O_3$ flakes.

The $Al_2O_3$ flakes are preferably coated with at least one high refractive index layer, like a layer of metal oxide, such as, for example, $TiO_2$, $ZrO_2$, $SnO_2$, $ZnO$, $Fe_2O_3$, $Fe_3O_4$, $FeTiO_5$, $Cr_2O_3$, $CoO$, and/or $Co_3O_4$. The $TiO_2$ layer may be in the rutile or anatase modification. In general, the highest quality and gloss and at the same time the most stable effect pigments are obtained when the $TiO_2$ is in the rutile modification. In order to obtain the rutile modification, an additive can be used which is able to direct the $TiO_2$ into the rutile modification. Useful rutile directors are disclosed in the U.S. Pat. Nos. 4,038,099 and 5,433,779 and EP 0 271 767. A preferred rutile director is $SnO_2$.

Preferred effect pigments based on $Al_2O_3$ flakes are coated with one or more layers of metal oxides, preferably with one metal-oxide layer only, in particular with $TiO_2$, $Fe_2O_3$, $Fe_3O_4$, $SnO_2$, $ZrO_2$ or $Cr_2O_3$. Especially preferred are $Al_2O_3$ flakes coated with $TiO_2$ or $Fe_2O_3$ or mixtures thereof.

The thickness of each high-refractive-index layer depends on the desired interference color. The thickness of each layer on the surface of the $Al_2O_3$ flakes is preferably 20-400 nm, preferably 30-300 nm, in particular 30-200 nm.

The number of layers on the surface of the $Al_2O_3$ flakes is preferably one or two, furthermore three, four, five, six or seven layers.

In particular, interference packages consisting of high- and low-refractive-index layers on the surface of the $Al_2O_3$ flakes result in effect pigments having increased gloss and a further increased interference color or color flop.

Suitable colorless low-refractive-index materials for coating are preferably metal oxides or the corresponding oxide hydrates, such as, for example, $SiO_2$, $Al_2O_3$, $AlO(OH)$, $B_2O_3$, $MgO*SiO_2$, compounds such as $MgF_2$ or a mixture of said metal oxides.

In the case of multilayers applied on the surface of the $Al_2O_3$ flakes, the interference system is, in particular, a $TiO_2$—$SiO_2$—$TiO_2$ layer sequence.

Furthermore, the effect pigments according to the invention may also have a semitransparent metal layer as outer layer. Coatings of this type are known, for example, from DE 38 25 702 A1. The metal layers are preferably chromium or aluminum layers having layer thicknesses of 5-25 nm.

Furthermore, the effect pigments based on $Al_2O_3$ flakes can be finally coated with an organic or inorganic dye as a top coat, preferably with Prussian Blue or Carmine Red.

Particularly preferred effect pigments based on the $Al_2O_3$ flakes according to the invention have the following layer sequence(s):

$Al_2O_3$ flake+$TiO_2$
$Al_2O_3$ flake+$TiO_2$/$Fe_2O_3$
$Al_2O_3$ flake+$Fe_2O_3$
$Al_2O_3$ flake+$Fe_3O_4$
$Al_2O_3$ flake+$TiO_2$+$Fe_2O_3$
$Al_2O_3$ flake+$TiO_2$+$Fe_3O_4$
$Al_2O_3$ flake+$TiO_2$+$SiO_2$+$TiO_2$
$Al_2O_3$ flake+$TiO_2$+$MgO*SiO_2$+$TiO_2$
$Al_2O_3$ flake+$Fe_2O_3$+$SiO_2$+$TiO_2$
$Al_2O_3$ flake+$TiO_2$/$Fe_2O_3$+$SiO_2$+$TiO_2$
$Al_2O_3$ flake+$TiO_2$+$SiO_2$+$TiO_2$/$Fe_2O_3$
$Al_2O_3$ flake+$TiO_2$/$Fe_2O_3$+$SiO_2$+$TiO_2$/$Fe_2O_3$
$Al_2O_3$ flake+$TiO_2$+$SiO_2$
$Al_2O_3$ flake+$TiO_2$+$SiO_2$/$Al_2O_3$
$Al_2O_3$ flake+$TiO_2$+$Al_2O_3$
$Al_2O_3$ flake+$SnO_2$
$Al_2O_3$ flake+$SnO_2$+$Fe_2O_3$
$Al_2O_3$ flake+$SnO_2$+$TiO_2$
$Al_2O_3$ flake+$ZrO_2$
$Al_2O_3$ flake+$TiO_2$+Prussian Blue
$Al_2O_3$ flake+$TiO_2$+Carmine Red The $TiO_2$ layer(s) in the preferred embodiments mentioned above can be in the rutile or anatase modification. In a preferred embodiment the $TiO_2$ layer is in the rutile modification. In a preferred embodiment the rutile modification is prepared by applying first a thin $SnO_2$ layer having a layer thickness in the range of 1-20 nm, followed by a $TiO_2$ layer.

The $Al_2O_3$ flakes mentioned above in the preferred embodiments can be doped or undoped.

In this application, the term "coating" or "layer" is taken to mean the complete enveloping of the $Al_2O_3$ flakes according to the invention.

The effect pigments based on doped or undoped $Al_2O_3$ flakes preferably consist of 27-83 wt. % of $Al_2O_3$ flakes and 17-73 wt. % of the coating layer(s) based on the total effect pigment. The $Al_2O_3$ flakes can be coated, for example, by wet chemical coating, by CVD or PVD processes.

The coating of the $\alpha$-$Al_2O_3$ flakes with one or more layers, preferably one or more metal oxide layers, is preferably carried out by wet-chemical methods, it being possible to use the wet-chemical coating methods developed for the preparation of pearlescent pigments. Methods of this type are described, for example, in DE 14 67 468, DE 19 59 988, DE 20 09 566, DE 22 14 545, DE 22 15 191, DE 22 44 298, DE 23 13 331, DE 15 22 572, DE 31 37 808, DE 31 37 809, DE 31 51 343, DE 31 51 354, DE 31 51 355, DE 32 11 602, DE 32 35 017 or also in further patent documents and other publications known to the person skilled in the art.

In the case of wet coating, the $Al_2O_3$ flakes are suspended in water, and one or more hydrolysable metal salts are added at a pH which is suitable for hydrolysis, which is selected in such a way that the metal oxides or metal-oxide hydrates are precipitated directly onto the flakes without secondary precipitations occurring. The pH is usually kept constant by simultaneous metered addition of a base and/or acid. The pigments are subsequently separated off, washed and dried at 50-150° C. for 1-18 h and calcined for 0.5-3 h, where the calcination temperature can be optimised with respect to the respective coating present. In general, the calcination temperatures are 500-1000° C., preferably 600-900° C. If desired, the pigments can be separated off after application of individual coatings, dried and optionally calcined and then re-suspended again for the application of the further layers.

The application of a SiO$_2$ layer to the Al$_2$O$_3$ flake and/or to the already coated Al$_2$O$_3$ flake is generally carried out by addition of a potassium or sodium water-glass solution at a suitable pH.

Furthermore, the coating can also be carried out in a fluidised-bed reactor by gas-phase coating, it being possible to use, for example, the methods proposed in EP 0 045 851 and EP 0 106 235 for the preparation of pearlescent pigments correspondingly.

The hue and chroma of the effect pigment based on Al$_2$O$_3$ flakes according to the invention can be varied within very broad limits through the different choice of the coating amounts or the layer thicknesses resulting therefrom. Fine tuning for a certain hue and or chroma can be achieved beyond the pure choice of amount by approaching the desired color under visual or measurement technology control.

The effect pigments according to the present invention can be employed indoors and outdoors. Outdoor application, in particular, makes high demands of the effect pigment. Various factors, such as exposure to light, high atmospheric humidity, high and low temperatures, occur here which act on the effect pigment. In particular, plastic parts and paint coats for outdoor applications are often subjected to extreme weathering conditions and long-lasting intense exposure to light over an extended time, which results in ageing of the materials.

In order to improve the weatherabiltiy, dispersibility and/or compatibility with the user media, it is possible, for example, for functional coatings of Al$_2$O$_3$ or ZrO$_2$ or mixtures thereof to be applied to the pigment surface. Furthermore, organic post-coatings are possible, for example with silanes, as described, for example, in EP 0090259, EP 0 634 459, WO 99/57204, WO 96/32446, WO 99/57204, U.S. Pat. Nos. 5,759,255, 5,571,851, WO 01/92425, US RE41,858 E or in J. J. Ponjeé, Philips Technical Review, Vol. 44, No. 3, 81 ff. and P. H. Harding J. C. Berg, J. Adhesion Sci. Technol. Vol. 11 No. 4, pp. 471-493.

In the case that the after-coating layer or functional coating layer contains one or more layers of a metal oxide, the amount of metal oxide of the functional coating layer has to be considered in the ratio of the amount of Al$_2$O$_3$ of the Al$_2$O$_3$ flakes and the amount of the metal oxide(s) of the coating layer(s) which has to be in the range of from 27:83 to 83:17.

Effect pigments according to the present invention which are pre-treated and contain small amounts of oxides or hydroxides of rare earth metal compounds show improved weatherability and less greyish effects. In particular effect pigments according to the present invention which contain oxides or hydroxides of rare earth metal compounds in the amount of 0.01-3%, in particular 0.05 to 2 wt. %, show further improved photostability and weather stability.

Thus, the invention furthermore relates to effect pigments based on Al$_2$O$_3$ flakes which contain 0.01-3 wt. % of oxides and hydroxides of rare earth metal compounds based on the total pigment.

Preferred rare earth metal compounds are Ce$_2$O$_3$, La$_2$O$_3$, and Y$_2$O$_3$.

In addition to the rare earth metal compounds, for example Ce$_2$O$_3$, the preferred further metal oxides present in the protective layer are Al$_2$O$_3$, SiO$_2$ and ZrO$_2$. Furthermore, the protective layer can contain an organic component in particular selected from organic coupling agents, organofunctional silanes, amino compounds, organic phosphorus compounds.

Suitable coupling reagents are for example, organosilanes, organoaluminates, organotitanates and/or zirconates. The coupling agents are preferably organosilanes.

Examples of organosilanes are propyltrimethoxysilane, n-hexyltrimethoxysilane, propyltriethoxysilane, isobutyltrimethoxysilane, n-octyltrimethoxysilane, i-octyltrimethoxysilane, n-octyltriethoxysilane, n-decyltrimethoxysilane, dodecyltrimethoxysilane, hexadecyltrimethoxysilane, vinyltrimethoxysilane, preferably n-octyltrimethoxysilane and n-octyltriethoxysilane. Suitable oligomeric, alcohol-free organosilane hydrolysates are, inter alia, the products marketed under the trade name Dynasylan® Hydrosil by Evonik Industries, such as, for example, Dynasylan® Hydrosil 2926, Dynasylan® Hydrosil 2909, Dynasylan® Hydrosil 2907, Dynasylan® Hydrosil 2781, Dynasylan® Hydrosil 2776, Dynasylan® Hydrosil 2627. In addition, oligomeric vinylsilane and also aminosilane hydrolysate is suitable as organic coating. Functionalised organosilanes are, for example, 3-aminopropyltrimethoxysilane (AMMO), 3-methacryloxytrimethoxysilane (DAMO), 3-glycidyloxypropyltrimethoxysilane (GLYMO), beta-(3,4-epoxy-cyclohexyl)ethyltrimethoxysilane, gamma-isocyanatopropyltrimethoxysilane, 1,3-bis(3-glycidoxypropyl)-1,1,3,3-tetramethyldisiloxane, ureidopropyltriethoxysilane, preferably 3-aminopropyltrimethoxysilane, 3-methacryloxytrimethoxysilane, 3-glycidyloxypropyl-trimethoxysilane, beta-(3,4-epoxycyclohexyl)ethyltrimethoxysilane, gamma-isocyanatopropyltrimethoxysilane. Examples of polymeric silane systems are described in WO 98/13426 and are marketed, for example, by Evonik Industries under the trade name Dynasylan® Hydrosil. The amount of organic coating is preferably between 0.2 and 5% by weight, based on the effect pigment, more preferably 0.5 to 2% by weight.

Suitable coupling agents are, among others, zirconium aluminates of the following structure:

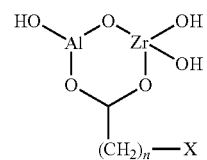

in which

X denotes NH$_2$, COOH, —COO$^-$, hydroxyphenyl, methacrylate, carboxyphenyl, alkyl, mercapto, phenyl, H, vinyl, styryl, melamin, epoxy, aryl or alkyl n denotes 0, 1, 2, 3, 4, 5, 6, 7, 8, 9, 10, 11 or 12.

Other suitable coupling reagents are metal acid esters of the following structure

wherein

M denotes Zr, Ti or Al, n denotes the valence of the metal,

Y is 1, 2 or 3 depending on the valence of the metal

R denotes (i) alkyl of 1-12 carbon atoms or aryl, (ii) alkyl or aryl substituted by —N(alkyl)$_3$, —NH(alkyl)$_2$, —NH$_2$(alkyl), —NH$_3$, N(aryl)$_3$, —NH(aryl)$_2$ or —NH$_2$(aryl), where aryl can be substituted by halogen, nitro, amino or hydrogen, Particularly suitable metal acid esters, for example acrylate functional and methacrylamide-functional titanates and methacrylamide-functional zirconates, are commercially available.

The proportion of the total amount of effect pigment made up by the protective layer on surface of the coated $Al_2O_3$ flakes is preferably 2 to 20 wt. %, more preferably 2 to 10 wt. % and in particular 2 to 5 wt. %. The protective layer as such contains preferably 0.2-2 wt. % of a rare earth metal oxide, more preferably $Ce_2O_3$, 0.2-2 wt. % of $SiO_2$ and 0.2-4 wt. % of $Al_2O_3$ and/or $ZrO_2$ and 1-10 wt. % of an organic component. In a preferred embodiment the organic component is a coupling agent.

In a preferred embodiment the protective layer consists of 0.4-1.5 wt. % of $Ce_2O_3$, 0.4-1 wt. % of $SiO_2$ and 0.5-2.5 wt. % of $Al_2O_3$ and/or $ZrO_2$ and 2-5 wt. % of the coupling agent.

Particular preferred are effect pigments according to the invention which contain a protective layer wherein the amount of $Ce_2O_3$ is 2 wt. % based on the total effect pigment.

Effect pigments according to the present invention which contain a protective layer with a cerium oxide content of 2 wt. % show further advantages, i.e. no yellowing in the dark, low or no yellowing under UV irradiation and humidity with phenolic antioxidants (for example BHT), high light fastness and high weather stability.

The protective coating on the effect pigments according to the invention is prepared by methods known to the skilled person. In a preferred embodiment the effect pigments are pre-treated by wet chemical coating.

In a preferred embodiment the effect pigment is suspended into water and after the pH has been adjusted to a value from 3 to 5, an aqueous salt solution or solid salt of the rare earth metal and aqueous salt solutions or solid salts of the metals aluminum and zirconium, or mixtures thereof, are added in a concentration of 1 to 4% by weight, based on oxide of the protection layer, to the pigment suspension. The pH value is raised to 9 and a dilute sodium or potassium silicate solution is added while the pH value is kept constant. In the last step, 1-10 wt. %, preferably 2 to 5 wt. % of at least one coupling reagent, based on the effect pigment, is added, the suspension is stirred and the pH value is adjusted to a value of 5 to 8. The treated effect pigment obtained is worked up and isolated by methods which are conventional for the person skilled in the art, for example by filtration, drying, and sieving.

The drying can be carried out at temperatures of preferably at 80 to 180° C. ° C., usually for 10 minutes, if necessary for 6-18 hours.

Effect pigments according to the invention containing a protective layer with 2 wt. % of $Ce_2O_3$ based on the total pigment, show further improved properties like improved photostability, less greyish coloration, very good weather resistance, very good suitability for water-thinnable surface-coating systems, in particular automotive paint systems, with respect to dispersibility, stability, coloristic properties, microbubble formation, swelling and luster.

The thickness of the protective layer on the effect pigment is in a preferred embodiment in the range of 0.5-10 nm, in particular 1-5 nm.

In a preferred embodiment the effect pigments according to the invention have a specific surface area of ≤12 $m^2/g$, preferably 8 $m^2/g$, measured by the BET method (DIN ISO 9277: 2003-05).

The effect pigments based on $Al_2O_3$ flakes according to the invention are compatible with a multiplicity of color systems, preferably from the area of paints, automotive coatings, industrial coatings, printing inks and cosmetic formulations. For the preparation of printing inks for, for example, gravure printing, flexographic printing, offset printing and offset overvarnishing, a multiplicity of binders, in particular water-soluble grades, as sold, for example, by BASF, Marabu, ProII, Sericol, Hartmann, Gebr. Schmidt, Sicpa, Aarberg, Siegberg, GSB-Wahl, Follmann, Ruco or Coates Screen INKS GmbH, is suitable. The printing inks can be water-based or solvent-based. The pigments are furthermore also suitable for the laser marking of paper and plastics and for applications in the agricultural sector, for example for greenhouse sheeting, and, for example, for the coloring of tent awnings.

It goes without saying that, for the various applications, the effect pigments according to the present invention can also advantageously be used in blends with organic dyes, organic pigments or other pigments, such as, for example, transparent and opaque white, colored and black pigments, and with flake-form iron oxides, holographic pigments, LCPs (liquid crystal polymers) and conventional transparent, colored and black luster pigments based on metal oxide-coated mica and $SiO_2$ flakes, etc. The effect pigments based on $Al_2O_3$ flakes according to the invention can be mixed in any ratio with commercially available pigments and fillers.

Fillers which may be mentioned are, for example, natural and synthetic mica, nylon powder, pure or filled melamine resins, talc, $SiO_2$, glasses, kaolin, oxides or hydroxides of aluminum, magnesium, calcium or zinc, BiOCl, barium sulfate, calcium sulfate, calcium carbonate, magnesium carbonate, carbon, and physical or chemical combinations of these substances. There are no restrictions regarding the particle shape of the filler. It can be, for example, flake-form, spherical or needle-shaped in accordance with requirements.

The effect pigments based on $Al_2O_3$ flakes according to the invention are simple and easy to handle. The $Al_2O_3$ flakes and the effect pigments based on $Al_2O_3$ flakes can be incorporated into the system in which it is used by simple stirring. Laborious milling and dispersing of the $Al_2O_3$ flakes and the effect pigments is not necessary.

The effect pigments based on $Al_2O_3$ flakes according to the invention can be used for pigmenting coating materials, printing inks, plastics, agricultural films, button pastes, for the coating of seed, for the coloring of food, coatings of medicaments or cosmetic formulations. The concentration of the $Al_2O_3$ flakes and the effect pigments in the system in which it is to be used for pigmenting is generally between 0.01 and 50% by weight, preferably between 0.1 and 5% by weight, based on the overall solids content of the system. This concentration is generally dependent on the specific application.

Plastics containing the effect pigments according to the invention in amounts of 0.1 to 50% by weight, in particular from 0.5 to 7% by weight, are frequently notable for a particular gloss effect.

In the coating sector, especially in automotive coatings and automotive finishing, the effect pigments according to the invention are preferably employed in amounts of 0.5-10% by weight.

In the coating material, the effect pigments according to the invention have the advantage that the desired color and gloss is obtained by a single-layer coating (one-coat systems or as a base coat in a two-coat system).

In the pigmentation of binder systems, for example for paints and printing inks for intaglio, offset or screen printing, the effect pigments based on $Al_2O_3$ flakes with Stapa®-aluminum and gold bronze pastes from Eckart GmbH have proven particularly suitable. The effect pigment is incorporated into the printing ink preferably in amounts of 2-50% by weight, more preferably 5-30% by weight and, in particular, 8-15% by weight. The printing inks containing the effect pigment according to the invention in combination with a metal effect pigment exhibit purer hues and are of improved printability owing to the good viscosity values.

The invention likewise provides pigment preparations containing the effect pigments according to the present invention and further effect pigments, binders and, if desired, additives, the said preparations being in the form of substantially solvent-free, free-flowing granules. Such granules contain up to 95% by weight of the effect pigment according to the invention. A pigment preparation in which the $Al_2O_3$ flakes and the effect pigments based on $Al_2O_3$ flakes according to the invention is pasted up with a binder and with water and/or an organic solvent, with or without additives, and the paste is subsequently dried and brought into a compact particulate form, e.g. granules, pellets, briquettes, a masterbatch or tablets, is particularly suitable as a precursor for printing inks.

The invention thus also relates to the use of the effect pigments in formulations from the areas of paints, coatings, automobile coatings, automotive finishing, industrial coatings, paints, powder coatings, printing inks, security printing inks, plastics, ceramic materials and cosmetics. The coated and uncoated $Al_2O_3$ flakes can furthermore be employed in glasses, in paper, in paper coating, in toners for electrophotographic printing processes, in seed, in greenhouse sheeting and tarpaulins, in thermally conductive, self-supporting, electrically insulating, flexible sheets for the insulation of machines or devices, as absorber in the laser marking of paper and plastics, as absorber in the laser welding of plastics, in pigment pastes with water, organic and/or aqueous solvents, in pigment preparations and dry preparations, such as, for example, granules, for example in clear coats in the industrial and automobile sectors, in sunscreens, as filler, in particular in automobile coatings and automotive finishing.

All percentage data in this application are per cent by weight, unless indicated otherwise.

The following examples are intended to explain the invention in greater detail, but without restricting it. Above and below, all percentages are per cent by weight.

EXAMPLES

Example 1

Production of $Al_2O_3$ Flakes 74.6 g of aluminum sulfate 18-hydrate, 57.1 g of poly aluminum chloride (PAC: Central Glass Co., LTD, 10% solution as $Al_2O_3$), 57.3 g of anhydrous sodium sulfate, and 46.9 g of potassium sulfate are dissolved in 300 ml of deionized water by heating above 60° C. 3.0 g of 34.4% of a titanyl sulfate solution are added to the solution. The resulting solution is designated as the aqueous solution (a).

0.45 g of sodium tertiary phosphate 12-hydrate and 55.0 g of sodium carbonate are added to 300 ml of deionized water. The resulting solution is designated as the aqueous solution (b).

The aqueous solution (b) is added with stirring to the aqueous solution (a) and kept at about 60° C. Stirring is continued for 1 h. The obtained mixture of solution (a) and solution (b) is a slurry. This slurry is evaporated to dryness and the dried product is heated at 1150° C. for 6 h. Water is added to the heated product to dissolve free sulfate. Insoluble solids are filtered off and washed with water. Finally, the product is dried.

The obtained alumina flake is examined by X-ray diffractometry. The diffraction pattern have only peaks attributed to corundum structure (α-alumina structure).

The obtained $Al_2O_3$ flakes have a $D_{50}$ value of 16.0 μm and $D_{90}$ value of 30.8 μm and a thickness of 200 nm.

The thickness distribution of the α-$Al_2O_3$ flake is 28.

Example 2

Production of $Al_2O_3$ Flakes 74.6 g of aluminum sulfate 18-hydrate, 57.1 g of poly aluminum chloride (PAC: Central Glass Co., LTD, 10% solution as $Al_2O_3$), 57.3 g of anhydrous sodium sulfate, and 46.9 g of potassium sulfate are dissolved in 300 ml of deionized water by heating above 60° C. 3.0 g of 34.4% of a titanyl sulfate solution and 5.5 g of 5.0% indium chloride (III) solution are added to the solution. The resulting solution is designated as the aqueous solution (a).

0.45 g of sodium tertiary phosphate 12-hydrate and 55.0 g of sodium carbonate are added to 300 ml of deionized water. The resulting solution is designated as the aqueous solution (b).

The aqueous solution (b) is added with stirring to the aqueous solution (a) and kept at about 60° C. Stirring is continued for 1 h. The obtained mixture of solution (a) and solution (b) is a slurry. This slurry is evaporated to dryness and the dried product is heated at 1200° C. for 4 h. Water is added to the heated product to dissolve free sulfate. Insoluble solids are filtered off and washed with water. Finally, the product is dried.

The obtained alumina flake is examined by X-ray diffractometry. The diffraction pattern have only peaks attributed to corundum structure (α-alumina structure).

The obtained $Al_2O_3$ flakes have a $D_{50}$ value of 19.0 μm and $D_{90}$ value of 35.6 μm and a thickness of 250 nm.

The thickness distribution of the α-$Al_2O_3$ flake is 32.

Example 3

Production of $Al_2O_3$ Flakes 1.3 g of 27% $Al_2(SO_4)_3$ solution, 345 g of $Na_2SO_4$, 280 g of $K_2SO_4$ and 6 g of $ZnSO_4*7H_2O$ solution are added to 1,205 ml water and heated at 70° C. An alkali solution is added consisting of 320 g of $Na_2CO_3$ and 2.7 g of $(NaPO_3)_6$ in 900 ml water at 70° C. The aluminium sulfate mixture solution is titrated with the alkali solution while stirring to pH 6.8. A gel mixture of pseudo-boehmite and flux is obtained. The gel mixture is aged at 90° C. for 20 hours, distilled under vacuum at 60° C. and dried at 110° C. for 20 h. The dried gel mixture is ground to a size less than 5 mm and calcined in a 2 l alumina crucible at 500° C. for 1 h to remove the moisture. The temperature is elevated to 930° C. and maintained for 0.5 h, so that a homogeneous molten salt is formed and flaky crystals are formed by the coagulation of acicular-alumina particles. Crystallization is performed at 1,150° C. for 5.5 h to obtain a flaky α-alumina crystal by filtering. The flaky α-alumina crystal is suspended in 3,000 l of a 0.5% sulfuric acid solution. The particles are stirred at 60° C. for 48 h for complete dispersion. The mixture is filtered again, washed with water and dried at 100° C. A transparent flaky α-alumina having a thickness of 255 nm and an average particle size of 15.6 µm is obtained.

Example 4

Coating of $Al_2O_3$ Flakes 20 g alumina flakes of Example 1 are suspended in 250 ml of deionized water. The resulting suspension is adjusted to pH 1.8-1.9 by addition of 10% HCl and is kept throughout the entire procedure at about 75° C. After stirring for 10 min, simultaneously a solution of 0.8 g of $SnCl_4$ in 15 ml of deionized water and a 32% solution of NaOH are added dropwise while maintaining the pH at 1.8-1.9. After stirring for 30 min, a solution containing 29 g of $TiCl_4$ in 50 ml of deionized water is added simultaneously with a 10% solution of NaOH while keeping the pH at 1.8-1.9. After stirring for 15 min the pH is adjusted to pH 7.5 by adding 32% sodium hydroxide solution.

After 10 min of stirring, a solution containing 4.8 g of $Na_2SiO_3$ in 25 ml of deionized water is added to the suspension. Simultaneously a 10% solution of HCl is added to keep the pH at 7.5. After 10 min stirring the pH is adjusted to 1.8 by adding a 10% solution of HCl. The suspension is allowed to settle and the volume is adjusted to ca. 280 ml by partly removing the clear solution on top of the settled particles.

While stirring, an additional layer of $SnO_2$ is deposited by simultaneous dropwise adding of a solution of 0.8 g of Snack in 15 ml of deionized water and 32% solution of sodium hydroxide while maintaining the pH at 1.8-1.9. After stirring for 30 min, a solution containing 21.9 g of $TiCl_4$ in 50 ml of deionized water is added simultaneously with a 10% solution of NaOH while maintaining the pH at 1.8-1.9. After 30 min stirring, the pH is adjusted to 5.0-5.3 and filtered. The filter cake is washed with water and dried. Finally, the dried solids are calcined at 850° C. for 30 minutes to give a highly bluish and glossy pearlescent pigment. At the luster angle, a strong bluish color and very high glossy appearance can be seen at a more wider angle.

Example 5

Coating of $Al_2O_3$ Flakes 20 g alumina flakes of Example 2 are suspended in 400 ml of deionized water. To the resulting suspension (kept at about 65° C.) is added a solution containing 125 g of $TiCl_4$ per liter. Simultaneously a 10% solution of NaOH is added to keep the pH at 2.1. The addition of the $TiCl_4$ solution is stopped when the resulting product takes on a yellowish color. Then a solution containing 50 g of $Na_2SiO_3$ per liter is added to the resulted suspension. Simultaneously a 10% solution of HCl is added to keep the pH at 7. Next a solution containing 125 g of $TiCl_4$ per liter is added to the resulted suspension. Simultaneously a 10% solution of NaOH is added to keep the pH at 2.1. The addition of the $TiCl_4$ solution is stopped when the resulting product takes on a bluish color. The suspending solids are filtered off, washed with water, and dried. Finally, the dried solids are calcined at 850° C. for 30 minutes to give a highly bluish and glossy pearlescent pigment. At the luster angle, a strong bluish color and very high glossy appearance can be seen at a more wider angle.

Example 6

Coating of $Al_2O_3$ Flakes 20 g alumina flakes of Example 2 are suspended in 250 ml of deionized water. The resulting suspension is adjusted to pH 1.8-1.9 by addition of 10% HCl and is kept throughout the entire procedure at about 75° C. After stirring for 10 min, simultaneously a solution of 0.8 g of $SnCl_4$ in 15 ml of deionized water and a 32% solution of NaOH are added dropwise while maintaining the pH at 1.8-1.9. After stirring for 30 min, a solution containing 29 g of $TiCl_4$ in 50 ml of deionized water is added simultaneously with a 10% solution of NaOH while keeping the pH at 1.8-1.9. After stirring for 15 min the pH is adjusted to pH 7.5 by adding 32% sodium hydroxide solution. After 10 min of stirring, a solution containing 4.8 g of $Na_2SiO_3$ in 25 ml of deionized water is added to the suspension. Simultaneously a 10% solution of HCl is added to keep the pH at 7.5. After 10 min stirring the pH is adjusted to 1.8 by adding a 10% solution of HCl. The suspension is allowed to settle and the volume is adjusted to ca. 280 ml by partly removing the clear solution on top of the settled particles.

While stirring, an additional layer of $SnO_2$ deposited by simultaneous dropwise adding of a solution of 0.8 g of SnCl in 15 ml of deionized water and 32% solution of sodium hydroxide while maintaining the pH at 1.8-1.9. After stirring for 30 min, a solution containing 21.9 g of $TiCl_4$ in 50 ml of deionized water is added simultaneously with a 10% solution of NaOH while maintaining the pH at 1.8-1.9. After 30 min stirring, the pH is adjusted to 5.0-5.3 and filtered. The filter cake is washed with water and dried. Finally, the dried solids are calcined at 850° C. for 30 minutes to give a highly bluish and glossy pearlescent pigment. At the luster angle, a strong bluish color and very high glossy appearance can be seen at a more wider angle.

Example 7

Coating of $Al_2O_3$ Flakes 20 g alumina flakes of Example 3 are suspended in 400 ml of deionized water. To the resulting suspension (kept at about 65° C.) is added a solution containing 125 g of $TiCl_4$ per liter. Simultaneously a 10% solution of NaOH is added to keep the pH at 2.1. The addition of the $TiCl_4$ solution is stopped when the resulting product takes on a yellowish color. Then a solution containing 50 g of $Na_2SiO_3$ per liter is added to the resulting suspension. Simultaneously a 10% solution of HCl is added to keep the pH at 7. Next a solution containing 125 g of $TiCl_4$ per liter is added to the resulted suspension. Simultaneously a 10% solution of NaOH is added to keep the pH at 2.1. The addition of the $TiCl_4$ solution is stopped when the resulting product takes on a bluish color. The suspending solids are filtered off, washed with water, and dried. Finally, the dried solids are calcined at 850° C. for 30 minutes to give a highly bluish and glossy pearlescent pigment. At the luster angle, a strong bluish color and very high glossy appearance can be seen at a more wider angle.

Example 8

Coating of $Al_2O_3$ Flakes 20 g alumina flakes of Example 3 are suspended in 250 ml of deionized water. The resulting suspension is adjusted to pH 1.8-1.9 by addition of 10% HCl and is kept throughout the entire procedure at about 75° C. After stirring for 10 min, simultaneously a solution of 0.8 g of $SnCl_4$ in 15 ml of deionized water and a 32% solution of NaOH are added dropwise while maintaining the pH at 1.8-1.9. After stirring for 30 min, a solution containing 29 g of $TiCl_4$ in 50 ml of deionized water is added simultaneously with a 10% solution of NaOH while keeping the pH at 1.8-1.9. After stirring for 15 min the pH is adjusted to pH 7.5 by adding 32% sodium hydroxide solution. After 10 min of stirring, a solution containing 4.8 g of $Na_2SiO_3$ in 25 ml of deionized water is added to the suspension. Simultaneously a 10% solution of HCl is added to keep the pH at 7.5. After 10 min stirring the pH is adjusted to 1.8 by adding a 10% solution of HCl. The suspension is allowed to settle and the volume is adjusted to ca. 280 ml by partly removing the clear solution on top of the settled particles.

While stirring, an additional layer of $SnO_2$ deposited by simultaneous dropwise adding of a solution of 0.8 g of SnCl in 15 ml of deionized water and 32% solution of sodium hydroxide while maintaining the pH at 1.8-1.9. After stirring for 30 min, a solution containing 21.9 g of $TiCl_4$ in 50 ml of deionized water is added simultaneously with a 10% solution of NaOH while maintaining the pH at 1.8-1.9. After 30 min stirring, the pH is adjusted to 5.0-5.3 and filtered. The filter cake is washed with water and dried. Finally, the dried solids are calcined at 850° C. for 30 minutes to give a highly bluish and glossy pearlescent pigment. At the luster angle, a strong bluish color and very high glossy appearance can be seen at a more wider angle.

Example 9

Surface Treatment of Coated $Al_2O_3$ Flakes 100 g of alumina flakes coated according to Example 4 are suspended in 1000 ml of deionized water. To the resulting suspension, kept at about 70° C. and adjusted to pH 7 with 10% HCl, is added 100 ml of a water glass solution containing 3.05 g $Na_2SiO_3$ during 90 min. Simultaneously a 10% solution of HCl is added to keep the pH at 7. Subsequently 100 ml of a solution containing 6.5 g aluminium sulfate ($Al_2(SO_4)_3*18H_2O$) is added during 90 min to the suspension while keeping the pH to 7 with 10% NaOH. After raising the pH to 7.5 with 10% NaOH 1.5 g of 3-aminopropyl-trimethoxysilane (CAS No. 13822-56-5) and 1.5 g 3-glycidyloxypropyl-trimethoxysilane (CAS No. 2530-83-8) were added subsequently during 15 min each to the suspension while keeping the pH at 7.0 with 10% HCl or 10% NaOH. The suspending solids are filtered off, washed with water, dried at 140° C. and sieved (325 mesh).

The surface-treated effect pigments show a good humidity resistance (humidity cabinet test), moderate weathering resistance due to remaining photoactivity.

Example 10

Surface Treatment of Coated $Al_2O_3$ Flakes

A 2 wt. % aqueous solution containing 2.55 g sodium hypophosphite ($NaH_2PO_2*H_2O$) was added at room temperature with stirring to a 5 wt-% aqueous solution containing 3.90 g zirconium oxychloride ($ZrOCl_2*8H_2O$) so slowly as not to form any white precipitate. To the clear solution thus obtained was added 4.1 g of a 35 wt. % hydrochloride acid, yielding a mixing solution of zirconium oxychloride and sodium hypophosphite.

100 g of alumina flakes coated according to Example 4 are suspended in 1000 ml of deionized water. To the resulting suspension, kept at about 70° C. and adjusted to pH 2.5 with 10% HCl, is added 2.95 g of cerium(III) chloride ($CeCl_3*7H_2O$). The solution of zirconium oxychloride and sodium hypophosphite is added during 60 min while keeping the pH at 2.5 with 10% NaOH. Then the pH is raised to 7.0 during 60 min by addition of 10% NaOH. 1.5 g of 3-aminopropyl-trimethoxysilane (CAS No. 13822-56-5), 1.5 g 3-glycidyloxypropyl-trimethoxysilane (CAS No. 2530-83-8), and 0.5 g n-hexyltrimethoxysilane (CAS No. 3069-19-0) were added subsequently during 15 min each to the suspension while keeping the pH at 7.0 with 10% HCl or 10% NaOH. The suspending solids are filtered off, washed with water, dried at 140° C. and sieved (325 mesh).

The surface-treated effect pigments show a good humidity and weathering resistance.

Example 11

Surface Treatment of Coated $Al_2O_3$ Flakes 100 g of alumina flakes coated according to Example 4 are suspended in 1000 ml of deionized water. To the resulting suspension, kept at about 70° C. and adjusted to pH 3.0 with 10% HCl, is added 1.70 g of cerium(III) chloride ($CeCl_3*7H_2O$) and 3.27 g of aluminium sulfate ($Al_2(SO_4)_3*18H_2O$. The pH is raised to 7.5 during 90 min with 10% NaOH. Then 50 ml of a water glass solution containing 3.03 g $Na_2SiO_3$ is added during 90 min while keeping the pH to 7.5 with 10% HCl. 1.5 g of 3-aminopropyl-trimethoxysilane (CAS No. 13822-56-5) and 1.5 g 3-glycidyloxypropyl-trimethoxysilane (CAS No. 2530-83-8) were added subsequently during 15 min each to the suspension while keeping the pH at 7.5 with 10% HCl or 10% NaOH. The suspending solids are filtered off, washed with water, dried at 140° C. and sieved (325 mesh).

The surface-treated effect pigments according to Example 11 with reduced cerium content show, compared to the Examples 9 and 10, superior humidity properties (very good humidity) and weathering resistance.

Example 12

Surface Treatment of Coated $Al_2O_3$ Flakes 100 g of alumina flakes coated according to Example 5 are suspended in 1000 ml of deionized water. To the resulting suspension, kept at about 70° C. and adjusted to pH 7 with 10% HCl, is added 100 ml of a water glass solution containing 3.05 g $Na_2SiO_3$ during 90 min. Simultaneously a 10% solution of HCl is added to keep the pH at 7. Subsequently 100 ml of a solution containing 6.5 g aluminium sulfate ($Al_2(SO_4)_3*18H_2O$) is added during 90 min to the suspension while keeping the pH to 7 with 10% NaOH. After raising the pH to 7.5 with 10% NaOH 1.5 g of 3-aminopropyl-trimethoxysilane (CAS No. 13822-56-5) and 1.5 g 3-glycidyloxypropyl-trimethoxysilane (CAS No. 2530-83-8) were added subsequently during 15 min each to the suspension while keeping the pH at 7.0 with 10% HCl or 10% NaOH. The suspending solids are filtered off, washed with water, dried at 140° C. and sieved (325 mesh).

The surface-treated effect pigments show a good humidity resistance (humidity cabinet test), moderate weathering resistance due to remaining photoactivity.

Example 13

Surface Treatment of Coated $Al_2O_3$ Flakes

A 2 wt. % aqueous solution containing 2.55 g sodium hypophosphite ($NaH_2PO_2*H_2O$) was added at room temperature with stirring to a 5 wt-% aqueous solution containing 3.90 g zirconium oxychloride ($ZrOCl_2*8H_2O$) so slowly as not to form any white precipitate. To the clear solution thus obtained was added 4.1 g of a 35 wt. % hydrochloride acid, yielding a mixing solution of zirconium oxychloride and sodium hypophosphite.

100 g of alumina flakes coated according to Example 5 are suspended in 1000 ml of deionized water. To the resulting suspension, kept at about 70° C. and adjusted to pH 2.5 with 10% HCl, is added 2.95 g of cerium(III) chloride ($CeCl_3*7H_2O$). The solution of zirconium oxychloride and sodium hypophosphite is added during 60 min while keeping the pH at 2.5 with 10% NaOH. Then the pH is raised to 7.0 during 60 min by addition of 10% NaOH. 1.5 g of 3-aminopropyl-trimethoxysilane (CAS No. 13822-56-5), 1.5 g 3-glycidyloxypropyl-trimethoxysilane (CAS No. 2530-83-8), and 0.5 g n-hexyltrimethoxysilane (CAS No. 3069-19-0) were added subsequently during 15 min each to the suspension while keeping the pH at 7.0 with 10% HCl or 10% NaOH. The suspending solids are filtered off, washed with water, dried at 140° C. and sieved (325 mesh).

The surface-treated effect pigments show a good humidity and weathering resistance.

Example 14

Surface Treatment of Coated $Al_2O_3$ Flakes 100 g of alumina flakes coated according to Example 5 are suspended in 1000 ml of deionized water. To the resulting suspension, kept at about 70° C. and adjusted to pH 3.0 with 10% HCl, is added 1.70 g of cerium(III) chloride ($CeCl_3*7H_2O$) and 3.27 g of aluminium sulfate ($Al_2(SO_4)_3*18H_2O$). The pH is raised to 7.5 during 90 min with 10% NaOH. Then 50 ml of a water glass solution containing 3.03 g $Na_2SiO_3$ is added during 90 min while keeping the pH to 7.5 with 10% HCl. 1.5 g of 3-aminopropyl-trimethoxysilane (CAS No. 13822-56-5) and 1.5 g 3-glycidyloxypropyl-trimethoxysilane (CAS No. 2530-83-8) were added subsequently during 15 min each to the suspension while keeping the pH at 7.5 with 10% HCl or 10% NaOH. The suspending solids are filtered off, washed with water, dried at 140° C. and sieved (325 mesh).

The surface-treated effect pigments according to Example 14 with reduced cerium content show, compared to the Examples 12 and 13, superior humidity properties (very good humidity) and weathering resistance.

Example 15

Surface Treatment of Coated $Al_2O_3$ Flakes 100 g of alumina flakes coated according to Example 6 are suspended in 1000 ml of deionized water. To the resulting suspension, kept at about 70° C. and adjusted to pH 7 with 10% HCl, is added 100 ml of a water glass solution containing 3.05 g $Na_2SiO_3$ during 90 min. Simultaneously a 10% solution of HCl is added to keep the pH at 7. Subsequently 100 ml of a solution containing 6.5 g aluminium sulfate ($Al_2(SO_4)_3*18H_2O$) is added during 90 min to the suspension while keeping the pH to 7 with 10% NaOH. After raising the pH to 7.5 with 10% NaOH 1.5 g of 3-aminopropyl-trimethoxysilane (CAS No. 13822-56-5) and 1.5 g 3-glycidyloxypropyl-trimethoxysilane (CAS No. 2530-83-8) were added subsequently during 15 min each to the suspension while keeping the pH at 7.0 with 10% HCl or 10% NaOH. The suspending solids are filtered off, washed with water, dried at 140° C. and sieved (325 mesh).

The surface-treated effect pigments show a good humidity resistance (humidity cabinet test), moderate weathering resistance due to remaining photoactivity.

Example 16

Surface Treatment of Coated $Al_2O_3$ Flakes

A 2 wt. % aqueous solution containing 2.55 g sodium hypophosphite ($NaH_2PO_2*H_2O$) was added at room temperature with stirring to a 5 wt-% aqueous solution containing 3.90 g zirconium oxychloride ($ZrOCl_2*8H_2O$) so slowly as not to form any white precipitate. To the clear solution thus obtained was added 4.1 g of a 35 wt. % hydrochloride acid, yielding a mixing solution of zirconium oxychloride and sodium hypophosphite. 100 g of alumina flakes coated according to Example 6 are suspended in 1000 ml of deionized water. To the resulting suspension, kept at about 70° C. and adjusted to pH 2.5 with 10% HCl, is added 2.95 g of cerium(III) chloride ($CeCl_3*7H_2O$). The solution of zirconium oxychloride and sodium hypophosphite is added during 60 min while keeping the pH at 2.5 with 10% NaOH. Then the pH is raised to 7.0 during 60 min by addition of 10% NaOH. 1.5 g of 3-aminopropyl-trimethoxysilane (CAS No. 13822-56-5), 1.5 g 3-glycidyloxypropyl-trimethoxysilane (CAS No. 2530-83-8), and 0.5 g n-hexyltrimethoxysilane (CAS No. 3069-19-0) were added subsequently during 15 min each to the suspension while keeping the pH at 7.0 with 10% HCl or 10% NaOH. The suspending solids are filtered off, washed with water, dried at 140° C. and sieved (325 mesh).

The surface-treated effect pigments show a good humidity and weathering resistance.

Example 17

Surface Treatment of Coated $Al_2O_3$ Flakes 100 g of alumina flakes coated according to Example 6 are suspended in 1000 ml of deionized water. To the resulting suspension, kept at about 70° C. and adjusted to pH 3.0 with 10% HCl, is added 1.70 g of cerium(III) chloride ($CeCl_3*7H_2O$) and 3.27 g of aluminium sulfate ($Al_2(SO_4)_3*18H_2O$). The pH is raised to 7.5 during 90 min with 10% NaOH. Then 50 ml of a water glass solution containing 3.03 g $Na_2SiO_3$ is added during 90 min while keeping the pH to 7.5 with 10% HCl. 1.5 g of 3-aminopropyl-trimethoxysilane (CAS No. 13822-56-5) and 1.5 g 3-glycidyloxypropyl-trimethoxysilane (CAS No. 2530-83-8) were added subsequently during 15 min each to the suspension while keeping the pH at 7.5 with 10% HCl or 10% NaOH. The suspending solids are filtered off, washed with water, dried at 140° C. and sieved (325 mesh).

The surface-treated effect pigments according to Example 17 with reduced cerium content show, compared to the Examples 15 and 16, superior humidity properties (very good humidity) and weathering resistance.

Example 18

Surface Treatment of Coated Al$_2$O$_3$ Flakes 100 g of alumina flakes coated according to Example 7 are suspended in 1000 ml of deionized water. To the resulting suspension, kept at about 70° C. and adjusted to pH 7 with 10% HCl, is added 100 ml of a water glass solution containing 3.05 g Na$_2$SiO$_3$ during 90 min. Simultaneously a 10% solution of HCl is added to keep the pH at 7. Subsequently 100 ml of a solution containing 6.5 g aluminium sulfate (Al$_2$(SO$_4$)$_3$*18H$_2$O) is added during 90 min to the suspension while keeping the pH to 7 with 10% NaOH. After raising the pH to 7.5 with 10% NaOH 1.5 g of 3-aminopropyl-trimethoxysilane (CAS No. 13822-56-5) and 1.5 g 3-glycidyloxypropyl-trimethoxysilane (CAS No. 2530-83-8) were added subsequently during 15 min each to the suspension while keeping the pH at 7.0 with 10% HCl or 10% NaOH. The suspending solids are filtered off, washed with water, dried at 140° C. and sieved (325 mesh).

The surface-treated effect pigments show a good humidity resistance (humidity cabinet test), moderate weathering resistance due to remaining photoactivity.

Example 19

Surface Treatment of Coated Al$_2$O$_3$ Flakes

A 2 wt. % aqueous solution containing 2.55 g sodium hypophosphite (NaH$_2$PO$_2$*H$_2$O) was added at room temperature with stirring to a 5 wt-% aqueous solution containing 3.90 g zirconium oxychloride (ZrOCl$_2$*8H$_2$O) so slowly as not to form any white precipitate. To the clear solution thus obtained was added 4.1 g of a 35 wt. % hydrochloride acid, yielding a mixing solution of zirconium oxychloride and sodium hypophosphite.

100 g of alumina flakes coated according to Example 7 are suspended in 1000 ml of deionized water. To the resulting suspension, kept at about 70° C. and adjusted to pH 2.5 with 10% HCl, is added 2.95 g of cerium(III) chloride (CeCl$_3$*7H$_2$O). The solution of zirconium oxychloride and sodium hypophosphite is added during 60 min while keeping the pH at 2.5 with 10% NaOH. Then the pH is raised to 7.0 during 60 min by addition of 10% NaOH. 1.5 g of 3-aminopropyl-trimethoxysilane (CAS No. 13822-56-5), 1.5 g 3-glycidyloxypropyl-trimethoxysilane (CAS No. 2530-83-8), and 0.5 g n-hexyltrimethoxysilane (CAS No. 3069-19-0) were added subsequently during 15 min each to the suspension while keeping the pH at 7.0 with 10% HCl or 10% NaOH. The suspending solids are filtered off, washed with water, dried at 140° C. and sieved (325 mesh).

The surface-treated effect pigments show a good humidity and weathering resistance.

Example 20

Surface Treatment of Coated Al$_2$O$_3$ Flakes 100 g of alumina flakes coated according to Example 7 are suspended in 1000 ml of deionized water. To the resulting suspension, kept at about 70° C. and adjusted to pH 3.0 with 10% HCl, is added 1.70 g of cerium(III) chloride (CeCl$_3$*7H$_2$O) and 3.27 g of aluminium sulfate (Al$_2$(SO$_4$)$_3$18H$_2$O. The pH is raised to 7.5 during 90 min with 10% NaOH. Then 50 ml of a water glass solution containing 3.03 g Na$_2$SiO$_3$ is added during 90 min while keeping the pH to 7.5 with 10% HCl. 1.5 g of 3-aminopropyl-trimethoxysilane (CAS No. 13822-56-5) and 1.5 g 3-glycidyloxypropyl-trimethoxysilane (CAS No. 2530-83-8) were added subsequently during 15 min each to the suspension while keeping the pH at 7.5 with 10% HCl or 10% NaOH. The suspending solids are filtered off, washed with water, dried at 140° C. and sieved (325 mesh).

The surface-treated effect pigments according to Example 20 with reduced cerium content show, compared to the Examples 18 and 19, superior humidity properties (very good humidity) and weathering resistance.

Example 21

Surface Treatment of Coated Al$_2$O$_3$ Flakes 100 g of alumina flakes coated according to Example 8 are suspended in 1000 ml of deionized water. To the resulting suspension, kept at about 70° C. and adjusted to pH 7 with 10% HCl, is added 100 ml of a water glass solution containing 3.05 g Na$_2$SiO$_3$ during 90 min. Simultaneously a 10% solution of HCl is added to keep the pH at 7. Subsequently 100 ml of a solution containing 6.5 g aluminium sulfate (Al$_2$(SO$_4$)$_3$*18H$_2$O) is added during 90 min to the suspension while keeping the pH to 7 with 10% NaOH. After raising the pH to 7.5 with 10% NaOH 1.5 g of 3-aminopropyl-trimethoxysilane (CAS No. 13822-56-5) and 1.5 g 3-glycidyloxypropyl-trimethoxysilane (CAS No. 2530-83-8) were added subsequently during 15 min each to the suspension while keeping the pH at 7.0 with 10% HCl or 10% NaOH. The suspending solids are filtered off, washed with water, dried at 140° C. and sieved (325 mesh).

The surface-treated effect pigments show a good humidity resistance (humidity cabinet test), moderate weathering resistance due to remaining photoactivity.

Example 22

Surface Treatment of Coated Al$_2$O$_3$ Flakes

A 2 wt. % aqueous solution containing 2.55 g sodium hypophosphite (NaH$_2$PO$_2$*H$_2$O) was added at room temperature with stirring to a 5 wt-% aqueous solution containing 3.90 g zirconium oxychloride (ZrOCl$_2$*8H$_2$O) so slowly as not to form any white precipitate. To the clear solution thus obtained was added 4.1 g of a 35 wt. % hydrochloride acid, yielding a mixing solution of zirconium oxychloride and sodium hypophosphite.

100 g of alumina flakes coated according to Example 8 are suspended in 1000 ml of deionized water. To the resulting suspension, kept at about 70° C. and adjusted to pH 2.5 with 10% HCl, is added 2.95 g of cerium(III) chloride (CeCl$_3$*7H$_2$O). The solution of zirconium oxychloride and sodium hypophosphite is added during 60 min while keeping the pH at 2.5 with 10% NaOH. Then the pH is raised to 7.0 during 60 min by addition of 10% NaOH. 1.5 g of 3-aminopropyl-trimethoxysilane (CAS No. 13822-56-5), 1.5 g 3-glycidyloxypropyl-trimethoxysilane (CAS No. 2530-83-8), and 0.5 g n-hexyltrimethoxysilane (CAS No. 3069-19-0) were added subsequently during 15 min each to the suspension while keeping the pH at 7.0 with 10% HCl or 10% NaOH. The suspending solids are filtered off, washed with water, dried at 140° C. and sieved (325 mesh).

The surface-treated effect pigments show a good humidity and weathering resistance.

Example 23

Surface Treatment of Coated Al$_2$O$_3$ Flakes 100 g of alumina flakes coated according to Example 8 are suspended in 1000 ml of deionized water. To the resulting suspension, kept at about 70° C. and adjusted to pH 3.0 with 10% HCl, is added 1.70 g of cerium(III) chloride (CeCl$_3$*7H$_2$O) and 3.27 g of aluminium sulfate (Al$_2$(SO$_4$)$_3$18H$_2$O. The pH is raised to 7.5 during 90 min with 10% NaOH. Then 50 ml of a water glass solution containing 3.03 g Na$_2$SiO$_3$ is added during 90 min while keeping the pH to 7.5 with 10% HCl. 1.5 g of 3-aminopropyl-trimethoxysilane (CAS No. 13822-56-5) and 1.5 g 3-glycidyloxypropyl-trimethoxysilane (CAS No. 2530-83-8) were added subsequently during 15 min each to the suspension while keeping the pH at 7.5 with 10% HCl or 10% NaOH. The suspending solids are filtered off, washed with water, dried at 140° C. and sieved (325 mesh).

The surface-treated effect pigments according to example 23 with reduced cerium content show, compared to the Examples 21 and 22, superior humidity properties (very good humidity) and weathering resistance.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosure[s] of all applications, patents and publications, cited herein and of corresponding EP application No. 16156942.1, filed Feb. 23, 2016, is [are] incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An effect pigment based on an Al$_2$O$_3$ flake which comprises an Al$_2$O$_3$ flake coated with one or more layers of a metal oxide and/or a metal oxide mixture:
    wherein the ratio of the amount by weight of Al$_2$O$_3$ of the Al$_2$O$_3$ flake to the amount by weight of the metal oxide(s) of the coating layer(s) is in the range of from 27:73 to 83:17 based on the total weight of the effect pigment;
    wherein one or more layers of a metal oxide and/or a metal oxide mixture comprise one or more layers of metal oxides selected of TiO$_2$, Fe$_2$O$_3$, Fe$_3$O$_4$, SnO$_2$, ZrO$_2$ or Cr$_2$O$_3$;
    wherein the thickness of each metal oxide and/or a metal oxide mixture layer on the Al$_2$O$_3$ flakes is 20-400 nm with the exception of any SnO$_2$ layer, which has a layer thickness of 1-400 nm;
    wherein the effect pigment contains on the surface a protective layer containing at least one rare earth metal oxide, at least one metal oxide that is silicon, aluminum or zirconium or mixtures thereof, and an organic compound, and
    wherein the protective layer contains 0.2-2 wt. % of the at least one rare earth metal oxide, 0.2-2 wt. % of SiO2, 0.2-4 wt. % of Al2O3 and/or ZrO2 and 1-10 wt. % of the organic compound.

2. The effect pigment according to claim 1 wherein the Al$_2$O$_3$ flake is coated on the surface with one or two metal oxide layers.

3. The effect pigment according to claim 1, wherein the Al$_2$O$_3$ flake is doped with TiO$_2$, ZrO$_2$, SiO$_2$, SnO$_2$, In$_2$O$_3$ or ZnO or a combination thereof.

4. The effect pigment according to claim 3, wherein the amount of doping is 0.01-5% by weight based on the Al$_2$O$_3$ flake.

5. The effect pigment according to claim 1, wherein the Al$_2$O$_3$ flake is doped with TiO$_2$ or ZnO.

6. The effect pigment according to claim 1, wherein the particle thickness of the Al$_2$O$_3$ flake is in the range of 130-500 nm.

7. The effect pigment according to claim 1, wherein the Al$_2$O$_3$ flake has a standard deviation of thickness distribution of less than 80.

8. The effect pigment according to claim 1, wherein the Al$_2$O$_3$ flake is coated to provide the following layer sequence:
    Al$_2$O$_3$ flake+TiO$_2$
    Al$_2$O$_3$ flake+TiO$_2$/Fe$_2$O$_3$
    Al$_2$O$_3$ flake+Fe$_2$O$_3$
    Al$_2$O$_3$ flake+Fe$_3$O$_4$
    Al$_2$O$_3$ flake+TiO$_2$+Fe$_2$O$_3$
    Al$_2$O$_3$ flake+TiO$_2$+Fe$_3$O$_4$
    Al$_2$O$_3$ flake+TiO$_2$+SiO$_2$+TiO$_2$
    Al$_2$O$_3$ flake+TiO$_2$+MgO/SiO$_2$+TiO$_2$
    Al$_2$O$_3$ flake+Fe$_2$O$_3$+SiO$_2$+TiO$_2$
    Al$_2$O$_3$ flake+TiO$_2$/Fe$_2$O$_3$+SiO$_2$+TiO$_2$
    Al$_2$O$_3$ flake+TiO$_2$+SiO$_2$+TiO$_2$/Fe$_2$O$_3$
    Al$_2$O$_3$ flake+TiO$_2$/Fe$_2$O$_3$+SiO$_2$+TiO$_2$/Fe$_2$O$_3$
    Al$_2$O$_3$ flake+TiO$_2$+SiO$_2$
    Al$_2$O$_3$ flake+TiO$_2$+SiO$_2$/Al$_2$O$_3$
    Al$_2$O$_3$ flake+TiO$_2$+Al$_2$O$_3$
    Al$_2$O$_3$ flake+SnO$_2$
    Al$_2$O$_3$ flake+SnO$_2$+Fe$_2$O$_3$
    Al$_2$O$_3$ flake+SnO$_2$+TiO$_2$
    Al$_2$O$_3$ flake+ZrO$_2$
    Al$_2$O$_3$ flake+TiO$_2$+Prussian Blue
    Al$_2$O$_3$ flake+TiO$_2$+Carmine Red,
    wherein a / mark indicates a mixed oxide.

9. The effect pigment according to claim 1, wherein the Al$_2$O$_3$ flake is coated with TiO$_2$ in the rutile or anatase modification.

10. The effect pigment according to claim 1, wherein the Al$_2$O$_3$ flake is coated with TiO$_2$ in the rutile modification.

11. The effect pigment according to claim 1, wherein the organic compound is organic coupling agents, organofunctional silanes, amino compounds or organic phosphorus compounds.

12. The effect pigment according to claim 1, wherein the rare earth metal oxide in the protective layer is cerium oxide.

13. The effect pigment according to claim 1, wherein the amount of the rare earth metal oxide in the effect pigment is ≤1 wt. %.

14. The effect pigment according to claim 1, wherein the protective layer has a thickness of 0.5-10 nm.

15. A formulation which comprises an effect pigment according to claim 1 which formulation is a formulation for: paints; coatings; automobile coatings; automotive finishing; industrial coatings; powder coatings; printing inks; security printing inks; plastics; ceramic materials; cosmetics;

glasses; paper; paper coating; toners for electrophotographic printing processes; seeds; greenhouse sheeting or tarpaulins; thermally conductive, self-supporting, electrically insulating, flexible sheets for the insulation of machines or devices; an absorber in the laser marking of paper and plastics; an absorber in the laser welding of plastics; pigment pastes with water; organic and/or aqueous solvents; a pigment preparation; or a dry pigment preparation.

16. A formulation containing one or more effect pigments according to claim 1 in an amount of 0.01-95% by weight, based on the formulation as a whole.

17. A formulation containing one or more effect pigments according to claim 1, which further comprises at least one component selected from the group consisting of: water, polyols, polar and nonpolar oils, fats, waxes, film formers, polymers, copolymers, surfactants, free-radical scavengers, antioxidants, stabilisers, odour enhancers, silicone oils, emulsifiers, solvents, preservatives, thickeners, rheological additives, fragrances, colorants, other effect pigments, UV absorbers, surface-active assistants, cosmetic active compounds, fillers, binders, pearlescent pigments, color pigments and organic dyes.

18. The effect pigment according to claim 1, wherein the interference and/or masstone color of the effect pigment is silver, and the ratio of the amount by weight of $Al_2O_3$ of the $Al_2O_3$ flakes to the amount by weight of the metal oxide(s) of the coating layer(s) is in the range of from 60:40 to 80:20 based on the total weight of the effect pigment.

19. The effect pigment according to claim 1, wherein the interference and/or masstone color of the effect pigment is blue, to the ratio of the amount by weight of $Al_2O_3$ of the $Al_2O_3$ flakes and the amount by weight of the metal oxide(s) of the coating layer(s) is in the range of from 35:65 to 60:40 based on the total weight of the effect pigment.

20. The effect pigment according to claim 1, wherein the interference and/or masstone color of the effect pigment is red, to the ratio of the amount by weight of $Al_2O_3$ of the $Al_2O_3$ flakes and the amount by weight of the metal oxide(s) of the coating layer(s) is in the range of from 35:65 to 65:35 based on the total weight of the effect pigment.

\* \* \* \* \*